June 23, 1970
C. A. HISSERICH
3,516,163
MARKING MACHINE
Filed June 3, 1969
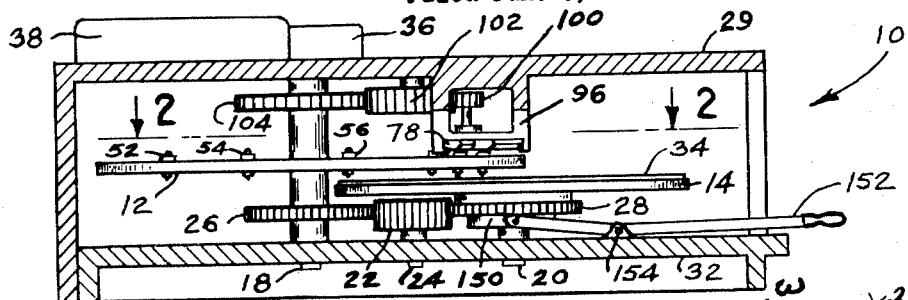
FIG. 1
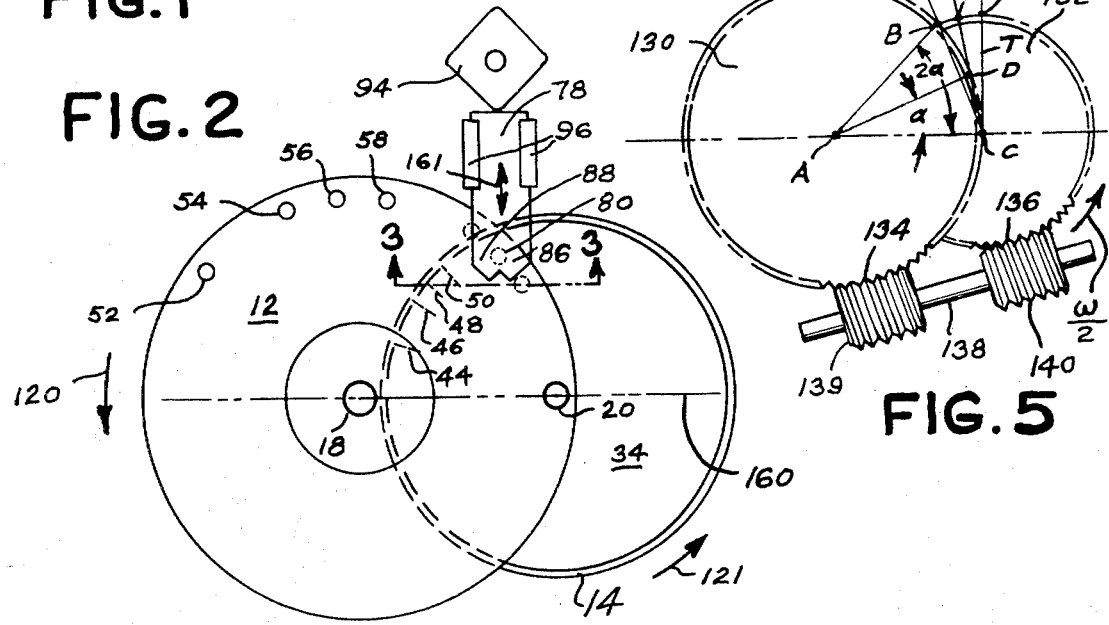
FIG. 2
FIG. 5
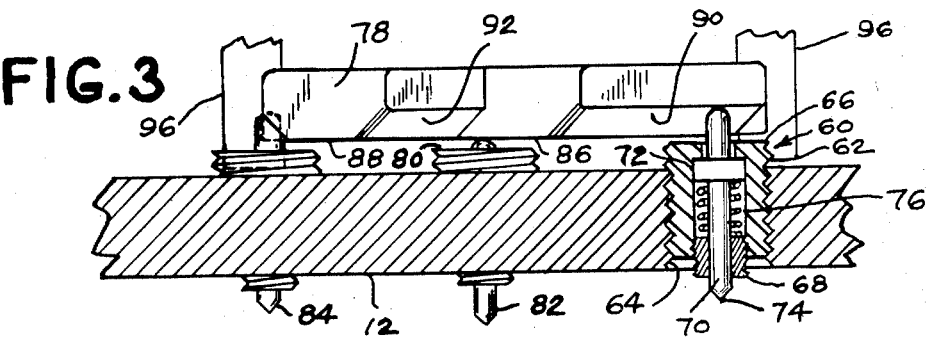
FIG. 3
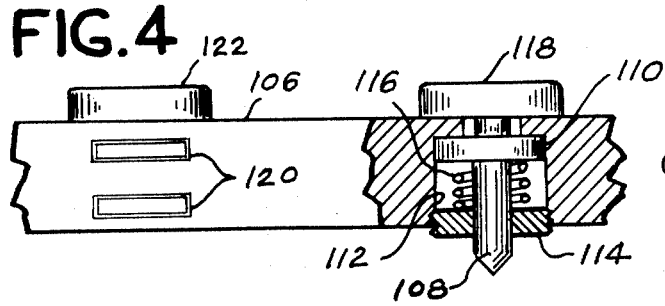
FIG. 4
INVENTOR.
CHARLES A. HISSERICH
BY
Lawrence Fleming
AGENT

United States Patent Office 3,516,163
Patented June 23, 1970

3,516,163
MARKING MACHINE
Charles A. Hisserich, 447 Cabrillo St.,
Costa Mesa, Calif. 92627
Filed June 3, 1969, Ser. No. 829,855
Int. Cl. B43l 13/24
U.S. Cl. 33—19                                 8 Claims

ABSTRACT OF THE DISCLOSURE

A machine for marking or engraving radial calibration lines on instrument dials and the like operates in a continuous mode, rather than requiring intermittent indexing and sliding machine elements.

True straight radial marking lines are generated on a continuously rotating workpiece by marking elements fixed to a continuously rotating carrier. Several marking elements or scribes may be fixed to the carrier, and raised and lowered according to a predetermined program, as by a cam, so that a complete scale can be marked or engraved in a single rotation of the workpiece.

---

This invention relates to improvements in dial marking and it relates in particular to a machine for marking lines, principally radial lines, at selected intervals to form circular instrument dial scales and the like.

In a wide variety of apparatus, ranging from drafting instruments to machine tools to scientific measuring apparatus and more, it is desirable to employ a scale in the form of a circle or a part of a circle. The division marks of such a scale are angularly spaced lines and advantageously are straight radial lines. Heretofore it has been difficult and expensive to produce dials with straight, radial, accurately spaced lines of uniform depth and width such as are required where accuracy and legibility and permanence are required. It is an object of this invention to provide a method and a structure by which such dials may be made more expeditiously and less expensively and more uniformly than has been possible previously.

An object of the invention is to provide a means by which dials may be marked in a continuously moving structure, thus to avoid the complexity and inherent difficulties which attend machinery which must continually stop, index, and restart in operation. A related object is to provide a relatively simple, inexpensively-produced marking machine which is readily manufactured in reliable and dependable form.

In certain applications it is desirable that the dial scale be formed as a shallow cone. They are called beveled dials and the invention is applicable to the marking of that kind of dial. In other applications (e.g., forming turbine blades) it is advantageous that the motion produced be curved rather than a straight radial motion. Such motions can be produced in practicing the invention and to provide a device with this capability is another object of the invention.

Certain of these, and other objects and advantages of the invention which will hereinafter appear are realized in part by the provision of a marking device; of means for imparting rotational displacement to the marking device and to a workpiece to be marked, they being displaced simultaneously about respectively associated axes at a predetermined relative angular velocity. According to the invention, when the marker and workpiece are displaced in the same rotational direction with a marker angular velocity twice that of the workpiece and a marker path extending through the axis of workpiece rotation, then a straight radial mark will result. Curved lines can be produced by changing the angular velocity ratio, marker path or relative displacement direction. The markers may be affixed to a rotatable carrier or marker plate.

The invention may be practiced using machinery to continuously rotate the marking device and the workpiece. Such continuously rotating machinery is preferred and one form of machine of this kind has been selected for illustration in the accompanying drawing in which:

FIG. 1 is a sectional view looking into a machine embodying the invention;

FIG. 2 is a plan view, as seen from line 2—2 of FIG. 1.

FIG. 3 is an enlarged partial cross-sectional view of a part of a marker plate or carrier and marker assembly, taken on line 3—3 of FIG. 2.

FIG. 4 is an enlarged partial cross-sectional view of a portion of a marker plate or carrier, and marker assembly of alternate form; and FIG. 5 is a schematic drawing illustrating geometrical principles of the apparatus of the invention.

The machine of FIG. 1 is shown with those elements related particularly to marking flat round dial plates with radial division marks. It includes a housing generally designated 10 within which are located means for making marks on the dial, a means for displacing the marking means angularly, a means for displacing the workpiece angularly, and a means for rendering the marking means effective to make marks of selected lengths. In this particular embodiment, means are included for rotating both the marker and the workpiece through complete revolutions, this being a preferred form of the invention. Also, in this embodiment, the marking means is displaced along a path which extends through the axis of workpiece rotation. Further, in this embodiment, means are provided for rotating the marking means and workpiece to be marked in a selected angular velocity ratio—here one half turn of the workpiece for each full turn of the marker.

The marking means may comprise marking elements in a variety of forms some of which place some substance, ink, paint or etching resist, on the workpiece and others of which cut a groove in the surface of the workpiece. The last is often preferred, and in this embodiment the marker has the form of a scribe which will form a groove when drawn over the surface of the dial plate. Means are included for selectively engaging and disengaging the scribe or scribes from the dial plate as the two are displaced, thus to control the length of the division marks scribed onto the dial. Two forms of marking device are illustrated. The form shown in FIG. 3 is incorporated in the machine of FIG. 1. An alternative form is shown in FIG. 4.

The means for displacing the marker relative to the workpiece may have a variety of forms and the means for moving the workpiece may also have a variety of forms. These two structures may be thought of as a means for displacing both the marker and workpiece. This is especially true because they are displaced simultaneously and in a given angular velocity ratio. Advantageously, as shown, these several means comprise two rotating elements, one to carry the marker and the other to carry the workpiece, and a motive and drive means to rotate the two elements together in coordinated fashion as by a motor-driven set of gears. In the embodiment illustrated the marker is mounted on a circular marker plate or carrier 12 with its scriber extending toward a workpiece disk 14 or workpiece holder on which a workpiece, such as 34, is mounted for rotation. The two disks 12 and 14, and the workpiece 34, lie in parallel planes and rotate about parallel axes. Marker disk 12 rotates on a drive shaft 18 and the workpiece disk 14 rotates on a shaft 20. Each of these shafts carries a spur gear meshed with an idler gear 22 rotatable on a shaft 24, FIG. 1. Gear 26 is fixed to the marker plate, disk, or carrier 12 and to shaft 18 so that both are rotated when shaft 18 is rotated. Gear 22 is meshed to gear 26 and is also meshed to gear 28 which is mounted on shaft 20 and is fixed to the workpiece disk 14. Both gear 28 and the workpiece disk 14 to which it is fixed are free to move vertically on shaft 20 under the constraint of yoke 150 and yoke actuating lever 152. The work face of idler gear 22 is of sufficient width to allow it to remain in mesh with gear 28 when the necessary vertical motion of gear 28 and workpiece disk 14 occurs. This vertical motion of workpiece disk 14 or workpiece holder serves to lower it sufficiently below marker plate 12 to allow the workpiece 34 to be loaded and/or unloaded with sufficient clearance to prevent it being accidentally marred by the scribe points or markers. Yoke actuating lever 152, which is pivoted at point 154 is held in either the unload and load position (lever 152 up, workpiece disk 14 lowered) or the "operate" position (lever 152 down, workpiece disk or holder 14 and workpiece 34 up), by detents of any suitable type not shown but which may be affixed to base 32. Thus disk 14 is rotated when shaft 18 is rotated to rotate carrier 12. Gears 26 and 28 may be chosen so that the marker disk 12 rotates at twice the velocity of workpiece disk 14. Thus when a point on the workpiece has been rotated through a given angle the marker will have been rotated through an angle twice as great, and, due to the action of idler gear 22, in the same angular direction or sense.

The housing 10 of the machine of FIG. 1 includes a pair of spaced frames or bearing plates 29, 32 between which the several disks and gears are disposed and mounted. The upper frame is designated by the reference numeral 29. The lower frame or base is designated 32. Shaft 18 extends between the two bearing plates 29 and 32 and may continue upward to a gear box indicated at 36 where it is rotated through an appropriate set of speed and direction changing gears by a drive motor 38, or other suitable driving means. The several shafts 18, 24 and 20 are provided with suitable thrust and radial bearings.

Any convenient means may be employed to secure the workpiece against rotation while it is being marked. While not shown in the drawings, such means may include a key-like projection which extends upward from the center of the workpiece disk into suitable openings in the workpiece or dial plate 34 (which lies flat against the workpiece disk 14 and is concentric with it), as is known in the art of machinery. Any suitable detent or locking devices may be used.

It is important, in this embodiment and in the preferred form of the invention, that the marker path lie on a circular arc that extends through the axis of workpiece rotation whereby the marks will be radial and straight. The two disks overlie one another. The workpiece disk or holder in this embodiment has the smaller diameter so that its margin clears the center drive shaft of the marker disk and so that the marker disk overlies the rotational axis of the workpiece disk. This construction permits the marker or markers to be mounted in the marker disk, plate, or carrier. Other constructions are possible, of course. The marker disk or carrier need not be center mounted or it could, like the workpiece disk or holder, be mounted on a shaft which extends in only one direction from the disk. Other structural arrangements are possible and may be preferable in particular applications such, for example, as in the marking of beveled dials where the marker must be made to follow the slope of the workpiece bevel in a more complex motion than that required here.

Only one marker may be used. It could be mounted for reciprocating arcuate motion or the disks could be indexed so the one marker would scribe all of the marks. Advantageously, however, a number of markers are employed as in this preferred embodiment. The markers may be all mounted equidistant from their common rotational axis at a distance equal to the spacing between that axis and the axis of workpiece rotation. The angular spacing between marking devices may determine the angular spacing between division marks on the dial. Since the dial is rotated at half the angular velocity of the marking devices, the marking devices are spaced twice the desired spacing between dial division marks. Obviously the divisions can be made non-uniform by spacing the markers non-uniformly. This is seen in FIG. 2 where the marker disk 12, the workpiece disk or holder 14 and the workpiece or dial plate 34 are all visible All of these elements may be understood to be steadily rotating counterclockwise as viewed in FIG 2. See arrows 120, 121. The marks are made by lowering the scriber portions of the marker assemblies as they move toward the edge of the dial plate after having passed over its center. In FIG. 2, marks 44, 46, 48 and 50 were made by markers 52, 54, 56 and 58, respectively. Marks 44 and 50 are equally spaced from mark 46 because the angle between markers 52 and 54 is equal to the angle between markers 54 and 58. But the angular spacing between markers 54 and 56 being only half as great, the spacing between marks 46 and 48 is only half as great. It will be apparent also that two revolutions of the marker carrier such as 12 will be required to mark the dial plate through a full circle. More intermediate marks than those shown in FIG. 2 can be made if the workpiece is indexed relative to the marker disk after completing one set of marks, or by other expedients. If the drive gears are selected with an appropriate number of teeth, indexing may be simply accomplished by unmeshing and remeshing the gears in different angular relationships.

The division marks on the workpiece 34 may be made in varying lengths; and they can be made in the direction toward or away from the dial plate center by appropriate selection of one of the variety of forms in which it is possible to produce the means for rendering the marking means effective. Thus in one example a multi-lobe cam actuator can be used in place of the 4-lobe actuator 94, to mark a dial with divisions including one long division followed, in order, by four short division marks, one intermediate length division mark, four short division marks and then marks which repeat that arrangement.

In the form of the invention shown it is necessary only to raise and lower the scriber. The scriber may be biased in one direction in which case it is required only to provide a cam or other mechanism structure to move the scriber or scribes against their bias when appropriate, according to the desired program.

A marker assembly 60 is shown in cross-section in FIG. 3. It comprises a cylindrical housing 62 the exterior of which is provided with external threads by which it is threaded into the internally threaded opening 64 in marker carrier plate 12. The upper end of housing 62 is bounded by a surface 66 having a central through opening. The lower end of the housing is closed by a threaded plug 68 which is provided with an axial opening. The scribe is a pin 70 of length to extend entirely through the surface 66 and plug 68. The central region of the pin has enlarged diameter to form a piston 72 by which the pin is confined to a reciprocating movement along its axis. The lower end of the pin is tapered to a scribe point 74. The upper end of the pin serves as a cam follower in cooperation with an actuating cam 78. Thus the pin is cammed down to scribe its mark and released upward in response to its bias when the mark is made. A bias spring 76, encircling the pin, is trapped between the lower face of piston 72 and the upper face of plug 68. Except that the construction of the marker like that of the remainder of the machine has been simplified for the sake of clarity this is one of the preferred marker forms.

Rotating cutters may be used instead of scribes, as in engraving machines.

In FIG. 3 the marker assembly 60 is understood to be moving toward the left relative to the cam 78. Pin 70 is approaching but has not engaged the cam 78. The adjacent marker assembly 80 is the one shown in dotted lines in FIG. 2. Its pin 82 has been cammed down to scribing position. The pin 84 of the next marker 42 has passed beyond the cam 78. When a marker pin is under a cam face it makes a mark. Before it gets to the cam and after leaving it the marker pin is retracted by its bias spring. To alter the length of the scribed marks it is only necessary to alter the distance traveled by the pin while under the cam. The mark length may be varied by changing cam lobe length or by any equivalent expedient, although altering cam length offers advantages. Cam 78 is provided with two or more cam faces or lobes. Two faces, numbered 86 and 88 are shown in this embodiment. Face 86 is the longer and, when engaged by the marker pin, results in scribing a longer mark. The two faces 86 and 88 are formed on the underside of cam 78. The sloping surface 90 in FIG. 3 leads to cam surface 86 and sloping surface 92 leads to cam surface 88.

Referring to the depiction of cam 78 and its guides 96, etc. in FIG. 2, and to the showing of cam 78 in FIG. 1, either cam surface 86 (for making long lines) or surface 88 (for shorter lines) may be selected by causing cam 78 to slide toward or away from the centerline 160 (FIG. 2). Cam 78 is mechanically biased by a spring or the like (not shown), away from centerline 160, and is driven toward the centerline 160 by a rotation of a cam actuator 94, which is fixed to gear 100 (FIG. 1). Cam actuator 94 is of a predetermined shape to provide the desired sequence of long and short marked lines, with appropriate selection of drive ratios through gears 104 and 100 (FIG. 1). Cam actuator 94 and cam 78 may be made of more complicated shapes to provide for marking lines of three or more different lengths, instead of the two lengths available from the simpler actuator and cam illustrated.

In FIG. 4, an alternative form is shown of a portion of a marker plate or carrier 106 (corresponding to marker plate or carrier 12 in FIGS. 1 and 2), provided with electromagnetically-actuated marking elements. A bore 112 may form a cylinder in which a pin 108 may reciprocate. The pin 108 is formed with a piston portion 110 disposed in a bore 112. The lower end of the bore is closed by a plug 114. The pin 108 extends below the disk or carrier 106 through a hole in the plug. It is held retracted by a bias spring 116 trapped between the lower face of the piston and the upper face of the plug. The pin is extended electromagnetically upon energization of an electromagnetic actuator indicated at 118. While the magnetic circuit of the actuator is not shown it may include the pin and have conventional and known form. The electric circuit to the actuator is not shown except that a pair of insulated commutator segments 120 are shown exposed at the outer edge of the marker carrier 106. These segments cooperate with a brush structure, not shown, to conduct energizing current through conductors in the disk to the marker, e.g., 122.

FIG. 5 illustrates schematically the geometric principle of the invention, with a disk driving system of alternative form. Disk 130 represents a marker plate or carrier and disk 132 represents a workpiece disk or holder. These disks 130 and 132 may be provided with gear teeth 134 and 136 respectively, or be connected to be driven by other gears, so that they can be driven simultaneously from a single shaft 138, as by double worm gears 139, 140. These are arranged so that the two disks are driven in the same direction and so that the marker disk 130 has an angular velocity $\omega$ twice that of the workpiece disk or holder 132, $\omega/2$.

Geometrically, the action in FIG. 5 is as follows: Line A–C represents a radius of disk 130 which is indicated as rotating counterclockwise about its center A. Line C–E is a tangent T to disk 130, erected perpendicular to radius A–C at point C. As radius A–C rotates to a new position A–D, it has moved through an angle $a$. Line C–D represents the chord of disk 130 corresponding to the angle of rotation $a$.

By geometry, the arc angle $a$ equals twice the angle $b$ between the tangent T and the chord C–D. The illustration in FIG. 5 is clarified by extending chord C–D beyond the rim at F, and by extending tangent T beyond the rim at point E, in order to show better the angle $b$ between the chord and the tangent.

Similarly, when radius A–C is further rotated counterclockwise about center A to a position A–B, it has rotated through twice the angle $a$, or $2a$. And by definition, $2a=2\times 2b$, and the angular relationship is maintained.

As the arc angle is always twice the angle between tangent and chord, then if point C, on the rim of disk 130, is rotated continuously at an angular velocity $\omega$, and if point E, on the rim of disk 132, is rotated at angular velocity $\omega/2$ in the same direction, then point C will follow along radius C–E until point C passes point B, at which time points C and E will coincide. Point C will have generated a locus of points which fall precisely on a straight line, the radius C–E of disk 132 which is now coincident with chord C–B of disk 130.

This relationship holds also if the angular rotational direction of both disks is reversed, the only difference being that the radial motion described by a point on disk 130 is now toward the center C instead of away from it, as described above. The same relationships also hold in the lower-left-hand quadrant of disk 132, the path generated being a mirror image about line A–C, FIG. 5, of the motion previously described. The relationship also holds for simultaneous rotation of the two disks at a relative angular velocity ratio of 2:1, whatever the absolute magnitudes of the velocities may be, and whether they are uniform or not.

It is noted that a leading feature of my invention is the continuous generation of straight radial graduation lines on dial blanks by means of essentially continuous relative rotation of the dial blank and a rotating carrier of marking elements. The geometry of my invention is such that true straight radial lines can be generated through the agency of such continuous rotation, in contrast to the prior practice of intermittently stopping the dial blank and then operating a linearly radial or sliding element which carries the marking device or marking devices.

The novel result of obtaining straight graduation lines is obtained by rotating the dial blank or workpiece and the marker carrier in the same sense at a 2:1 ratio. This invention is not, however, to be construed as being limited to pure straight line generation nor to such senses or ratios. The invention's purview is believed to include the generation of certain curves by means of continuously rotating elements of the general kind described, with other senses of rotation and velocity ratios.

It is also noted that a feature of my invention is the provision of a plurality of marking devices on the marker carrier, in order to provide a logical succession of lines, such as those used in analog scales denoting quantities in decimal sequence: relatively short lines at the scale positions corresponding to relative quantities of 1, 2, 3, 4, 6, 7, 8, and 9; and longer lines at 0, 5, and 10.

I claim:

1. Apparatus for marking lines on a workpiece, comprising:
   a rotatable holder to rotate said workpiece in its own plane,
   a rotatable carrier carrying a marking device adapted to mark said workpiece, in a circular path which overlaps said workpiece, and
   a connection between said holder and said carrier maintaining a fixed speed ratio and known phase relation between their respective rotations.

2. Apparatus as in claim 1, wherein:
   said workpiece is disk-like,
   said connection comprises 1:2 gearing respectively to rotate said holder and carrier in the same sense, and
   said circular path intersects the center of rotation of said holder, whereby said lines are geometrically determined as straight and radial.

3. Apparatus as in claim 1, wherein: said carrier carries a plurality of marking devices traversing along the same circular path, said path substantially intersecting the center of rotation of said holder.

4. Apparatus as in claim 2, wherein: said carrier carries a plurality of marking devices traversing along substantially the same circular path.

5. Apparatus as in claim 2, further comprising: cam means to raise and lower said marking device at predetermined points to produce dial graduations of predetermined length on said workpiece.

6. Apparatus as in claim 4, further comprising: multi-lobe cam means to raise and lower said marking devices at predetermined points to produce radial dial graduations of different predetermined lengths on said workpiece.

7. Apparatus as in claim 4, further comprising: electromagnetic means to raise and lower said marking devices at predetermined points.

8. Apparatus as in claim 1, further comprising: detent means to select said phase relation and maintain it during the marking of a line.

References Cited

UNITED STATES PATENTS

| | | |
|---|---|---|
| 1,653,426 | 12/1927 | Bauersfeld. |
| 2,140,556 | 12/1938 | Satterlee. |
| 3,136,061 | 6/1964 | Heard. |

HARRY N. HAROIAN, Primary Examiner